US012716745B2

(12) United States Patent
Byrne et al.

(10) Patent No.: US 12,716,745 B2
(45) Date of Patent: Aug. 25, 2026

(54) AUTOMATED DIGITAL MAP UPDATE BASED ON MEDIA MESSAGES

(71) Applicant: TomTom Global Content B.V., Amsterdam (NL)

(72) Inventors: Matthew Bastone Byrne, San Francisco, CA (US); Tomte Jan Cool, Haarlem (NL); Christian Julian Luz Cruz, Molin, IL (US); Dominique Daalhuyzen, Delft (NL); Mert Ergin, 's-Hertogenbosch (NL); Przemyslaw Piotr Polewski, Burton, MI (US)

(73) Assignee: TomTom Global Content B.V., Amsterdam (NL)

( * ) Notice: Subject to any disclaimer, the term of this patent is extended or adjusted under 35 U.S.C. 154(b) by 0 days.

(21) Appl. No.: 18/887,960

(22) Filed: Sep. 17, 2024

(65) Prior Publication Data

US 2026/0079026 A1 Mar. 19, 2026

(51) Int. Cl.
*G01C 21/00* (2006.01)
*G08G 1/0967* (2006.01)
*H04W 4/90* (2018.01)

(52) U.S. Cl.
CPC ... *G01C 21/3815* (2020.08); *G08G 1/096791* (2013.01); *H04W 4/90* (2018.02)

(58) Field of Classification Search
CPC ............ G01C 21/3815; G01C 21/3691; G08G 1/096791; G08G 1/096844; G08G 1/0141; G08G 1/0112; G08G 1/0133; H04W 4/90
See application file for complete search history.

(56) References Cited

U.S. PATENT DOCUMENTS

| | | | | |
|---|---|---|---|---|
| 5,948,042 A * | 9/1999 | Heimann | G01C 21/3815 | 701/117 |
| 6,177,885 B1 * | 1/2001 | Weil | G08G 1/0104 | 340/937 |
| 10,627,240 B2 * | 4/2020 | Denaro | G06F 16/29 | |
| 2005/0209774 A1 * | 9/2005 | Finlay | G08G 1/096775 | 701/532 |

(Continued)

OTHER PUBLICATIONS

Masters Thesis eal_time_road_traffic_information_detection_through_social_medi (Year: 2015).*

(Continued)

*Primary Examiner* — Fadey S. Jabr
*Assistant Examiner* — Ashutosh Pande
(74) *Attorney, Agent, or Firm* — Whitmyer IP Group LLC

(57) ABSTRACT

Various embodiments of methods and systems for automated update of digital map data based on media messages are described herein. Communication messages are collected from one or more media services. Information relevant to an accident and comprising at least one road reference is extracted from the collected messages. Further, the extracted information is matched with a digital map to identify at least one road and/or road segment affected by the incident. At least one property associated with the at least one road and/or road segment is adjusted in the digital map based on the extracted information as matched. Based on the adjusting, information about an intensity of the incident associated with the at least one road and/or road segment is presented to clients.

20 Claims, 6 Drawing Sheets

(56) References Cited

U.S. PATENT DOCUMENTS

| | | | | |
|---|---|---|---|---|
| 2012/0123667 | A1* | 5/2012 | Gueziec | G08G 1/0133 701/119 |
| 2012/0166076 | A1* | 6/2012 | Hardy | G01C 21/3415 701/414 |
| 2014/0236464 | A1* | 8/2014 | Gueziec | G08G 1/096775 701/117 |
| 2015/0285656 | A1* | 10/2015 | Verheyen | G08G 1/0129 701/428 |
| 2016/0275787 | A1* | 9/2016 | Kesting | G08G 1/0125 |
| 2017/0098373 | A1* | 4/2017 | Filley | H04W 4/90 |
| 2019/0236952 | A1* | 8/2019 | Suzuki | G08G 1/0133 |
| 2020/0090503 | A1* | 3/2020 | Rolf | G08G 1/0116 |
| 2020/0356100 | A1* | 11/2020 | Nagarajan | G05D 1/247 |
| 2021/0003420 | A1* | 1/2021 | Hamperl | G01C 21/3602 |
| 2021/0404818 | A1* | 12/2021 | Xu | G01C 21/3461 |
| 2022/0084398 | A1* | 3/2022 | Zhang | G08G 1/096791 |
| 2022/0207996 | A1* | 6/2022 | Xu | G01C 21/3691 |
| 2024/0194063 | A1* | 6/2024 | Sonnenburg | G08G 1/0141 |
| 2024/0271962 | A1* | 8/2024 | Stenneth | G08G 1/0133 |
| 2025/0137814 | A1* | 5/2025 | Rowell | G01C 21/3859 |

OTHER PUBLICATIONS

Reliable Traffic Flow prediction with LLM Apr. 21, 2024 (Year: 2024).*

* cited by examiner

AUTOMATED DIGITAL MAP UPDATE BASED ON MEDIA MESSAGES

BACKGROUND

There are many examples when randomly occurring incidents may have an impact on geographical regions. For example, such incidents could be naturally occurring or human inflicted disasters like wildfires, floods, storms, etc. By nature, these incidents are dynamic, and difficult to predict and to evaluate. Various mechanisms were established to analyze and to follow the development of incidents of such nature, and to provide relevant data about affected regions, spread polygons, severity, etc. For example, organizations dealing with the impact of natural disasters are created, such as CAL FIRE (California Department of Forestry and Fire Protection) that among other things collects and updates data for current fires in the state of California that may affect the safety and the property of the population.

Information relevant to the dynamics of natural incidents (and others) that may affect larger geographical areas and/or parts of the population is communicated via various media networks, including broadcasting services, social media and the like. For example, with respect to exchanging information about incidents, there are official media channels, pages and accounts on different platforms, e.g., California district Fire Departments (FDs), Departments of Transportation (DOTs), etc., maintain accounts and pages on X (former Twitter) to follow the real time development of wildfires.

Often, incidents of this kind impact the transportation network of the affected regions and create risks for travelers. Depending on the severity of the incidents, the associated hazards may hinder or even prevent the traversing of roads, for example. Given the dynamic nature of the incidents, the promptness in providing updated information about the developing impact on the road network is vital for minimizing the risks and for the human and property protection. The traveling on a transportation network affected by an incident may be difficult to plan or guide solely based on the information from the official media sources. Promptly updated digital map information and navigation in sync with the development of the incidents would significantly minimize the risks, e.g., when finding a path through a region within the perimeter of a developing incident.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for automated digital map update based on media messages are described herein. In the following description, numerous specific details are set forth to provide a thorough understanding of the embodiments. A person skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
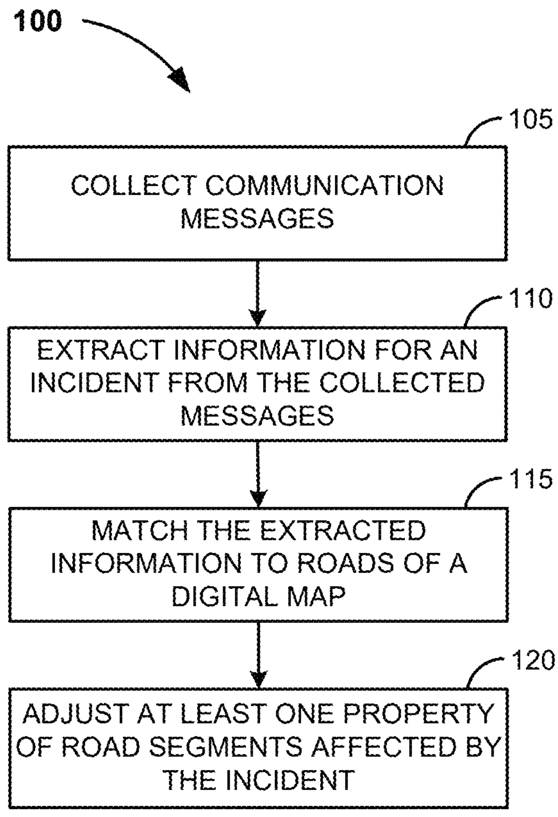
FIG. 1 is a flow diagram illustrating an exemplary process to update a digital map based on media messages.

FIG. 1 illustrates process 100 to update a digital map based on media messages, according to one embodiment. At 105, communication messages are received and/or collected from one or more media services. Electronic medias enable and facilitate quick exchange of information, specifically regarding the development of incidents. There are various ways of gathering media information. For example, besides listening, there are different forms of following or subscribing to broadcasting services, as well as to social media. Very often, media service providers enable automated submitting and receiving information directly, e.g., on their servers via specialized application programming interfaces (APIs). For the purposes of streamlining and without excluding other types of broadcasting and/or social media services and/or the likes, the description will be based on gathering social media messages via dedicated API, and more specifically, on scraping information from messages exchanged on X social media (former Twitter). A person skilled in the art would recognize that collecting information from other media sources in a similar way would be also part of the described embodiments.

The gathered media messages (e.g., tweets) may be structured or free text. Further, they may be exchanged between random subscribers. In one embodiment, only or preferably messages published via specific accounts may be selected. For example, the official X accounts of CAL FIRE, California district FDs and California DOTs may be monitored with respect to wildfire incidents. Similarly, messages exchanged on other accounts and/or channels may be likely to include information about the incident. In one embodiment, the sources of information, such as official accounts, personal accounts, dedicated or general channels, may be prioritized, e.g., based on a kind of incident, location and/or an associated probability to contain relevant information. In one embodiment, a combination of data sources may be used. For example, CAL FIRE website offers data pertinent to wildfires updated. This data may be combined at least with data from at least several active X accounts, e.g., from California district Departments of Transportation and fire Departments that consistently update road closure information throughout the wildfire season.

In one embodiment, the communication messages may be collected or gathered automatically via an interface complying with a definition provided by the corresponding media service. For example, the messages may be read and/or received via a dedicated API or APIs. The gathering of messages may be periodical and/or on demand, e.g., triggered by the publishing of a new message or when a new incident or incident change prompts. Either or both of 'push' and 'pull' message exchange may be supported, according to one embodiment. The collected messages may be, for example, stored in a database or as a file with a particular format, or in other form/s for further analysis. In one embodiment, the messages may be stored in a JavaScript Object Notation (JSON) formatted file, e.g., containing 'attribute-value' pairs.

At 110, information for an incident is extracted from the collected messages, according to one embodiment. The incident may be of different kind and/or category, having an impact on the road network, e.g., leading to road closures and/or increasing the risks of traversing the affected parts of the road network. For a purpose of illustration, the incident may be a wildfire taking place in a particular area. For example, the incident may be a wildfire spanning over one or more districts or even counties of the state of California. Accordingly, it could be expected that messages published by particular subscribers, such as the California FDs in the affected districts, CAL FIRE, etc., would include information about the incident.

Such information may be extracted automatically by utilizing different approaches. For example, by digitally searching for particular characters or combination of characters in the messages. Furthermore, the extracting may be selective, e.g., prioritizing the information from official accounts and specialized channels and pages.

In one embodiment, the information is extracted utilizing Artificial Intelligence (AI) based solutions, more specifically, Large Language Models (LLM) based solutions. In one embodiment, solutions based on Generative Pre-trained Transformer 3 (GPT-3) and/or next versions LLM introduced by OpenAI Inc., such as ChatGPT or similar, could be used for extracting information relevant to the incident. An expert in the field would recognize that other similar solutions either proprietary or provided by other vendors may be used as well, For example, an LLM based application may be prompted over the collected messages to identify the relevant information, including wildfire names, county names, affected roads names, etc. LLM may be used also to generalize the names of the affected roads as used in the messages into a more suitable format for matching with the names of the same roads as used in a digital map. Another possible utilization based on LLM would be to translate the collected messages to a common language, ensuring that there is no information omitted due to language differences.

Below, example ChatGPT-like prompts are provided that, if executed over the messages, e.g., X tweets, collected in an input JSON file, would extract information relevant to a wildfire incident in a structured output JSON file, available for further processing and reporting:

Prompt 1:
"Given an input JSON file containing tweet data in an arbitrary language, your task is to extract relevant information from the tweets in an output JSON format. You should first translate the tweet text into English. Each tweet object in the JSON formatted output should include the following attributes:
"road_closure": a boolean indicating if there is a identified road closure
"wildfire_name": the name of the wildfire
"county_name": the name of the county the wildfire is located
"road_name"; the name of the identified closed road
"road_number": the number in the "road_name", if present
"road_rest": the "road_name" without the number, if present
"location_start": the location of the start of the road closure
"location_end": the location of the end of the road closure
"description": a shorter description of the tweet"

Prompt 2:
"Additionally, you need to generalize the road names by converting any abbreviations to their full forms. For example, convert "US-50" to "US Highway 50", "FM 12" to "Farm to Market Road 12", "FSR 15" to "Field Service Route 15", and "FS 4" to "Field Service Route 4\'
Example output:

"road_closure": true,
"wildfire_name": "Hushfire"
"county_name": "Test county",
"road_name": "Field Service Route 66",
"road_number": 66,
"rest_road": "Field Service Route",
"location_start": "County Road 21",
"location_end": "County Road 66",
"description": "The Hushfire in Test county, FS 66 is closed at County Road 21, prompted evacuation orders Thursday by the sheriff's office. Residents east of U.S. Highway 287, south to Arapaho Valley Road, east to County Road 21 and north to County Road 66 were under the order, which was downgraded to voluntary on Friday afternoon. On Friday evening the voluntary status was lifted.
Residents living in the area between County Road 21 County Road 21C were downgraded Thursday night to voluntary evacuations. Those voluntary orders were lifted Friday. County Road 23 reopened to northbound traffic on Friday, according to the sheriff's office."

-continued

You should process each tweet in the input JSON file and extract the required information, including the road number and the road name without the number if applicable.
Only output the requested JSON with its attributes, don't add any extra fields or notes.
You may be presented with multiple user prompts, separate the responses with double new line break."

In one embodiment, process 100 may include collecting communication messages from more than one electronic media where information about the incident is provided and/or exchanged. The messages from such different medias collected automatically, for example, via appropriate interfaces as described, may be stored together or separately per media or media type (e.g., in one or more JSON files or/and on one or more storages). The information may be extracted simultaneously from the messages, or separately per file or storage. In addition to the information extracted from the messages with the help of AI, as illustrated, additional data may be collected such as: when a message was created, message id, username (e.g., the media account holder or user), link to the original message, location of the user, etc.

Once the information relevant to the incident is extracted from the collected messages, it can be used for matching it to roads included in a digital map, at 115. In one embodiment, the digital map may be a proprietary digital map (e.g., maps provided by companies such as TomTom N.V., Here Global B.V., Alphabet Inc) or an open source digital map (e.g., OpenStreetMap by OpenStreetMap Foundation), or the likes.

In the digital map, the name of the roads may differ, sometimes substantially, from the names of the same roads as referred in the media messages. The messages are usually human generated, hence prone to typos, abbreviations, omissions, nicknaming, etc. Even after the processing of the messages with the help of an LLM, there would be differences between names of roads as extracted from the media messages and the names of the same roads as stored in the digital map, even simply because the LLM may not be aware of the names of the roads used in the digital map.

In one embodiment, an internal LLM or other AI solution (e.g., similar to ChatGPT) may be developed or configured or customized to make the matching between the media data and the digital map data more efficient. For example, an LLM application may be fine-tuned with the help of confidential customer data, e.g., data provided by the digital map provider. Such data may relate to road names, areas, locations data, administrative data, service-related data (including various points of interest), etc. In one embodiment, personal data, e.g., relevant to preferences, behavior, etc., may also be used for training the LLM application.

Fuzzy searching may be applied to match the extracted information to roads of the digital map. The fuzzy searching does not require exact matching and it can be defined as suitable for the purpose of the matching between the information scraped from electronic medias and the roads in the digital map. The fuzzy searching as defined may calculate matching scores that are not binary or Boolean (e.g., "yes" or "no", "true" or "false") and reflect the similarity between the information extracted from the different media messages and the roads in the digital map. Thus, strings or text are found in the messages that fall between the definitive parameter values (e.g., "yes" and "no", "0" and "100"), within intermediate degrees of similarity or scores. The following table shows exemplar fuzzy search matching scores:

| Road in Map | Information from message | Fuzzy search match score |
|---|---|---|
| San Vicente Rd | San Vicente Road | 97 |
| US-101 S | U.S. 101 | 93 |
| Anchor Ave | Anchor Avenue | 82 |
| Santa Rosa Creek Rd | Santa Rosa/Old Creek Road | 81 |
| Deniz Brothers Ln | Deniz Bros Lane | 78 |
| S Santa Anita Ave | Santa Anita Ave. on- and off-ramps | 71 |

In one embodiment, the road names in the digital map are used to match the scraped road names from the media/s using a proprietary fuzzy-searching solution or/and a third-party fuzzy searching mechanism or service. An example for third-party fuzzy searching service is fuzzy matching as provided by Redis Ltd. The matching may be done by cross joining the digital map with the messages and selecting the best matching road name corresponding to one or more road segments for each or at least some of the messages.

The fuzzy searching may use an algorithm may use different techniques to find duplicate strings that do not immediately share the same characteristics. For example, partial string matching and token sort ratio (e.g., breaking down a string into words and sorting them such that the order of the words do not matter, "apple orange banana" has 100% match to "orange banana apple"). In one embodiment, fuzzy searching may be facilitated utilizing AI machine learning (ML) mechanism to identify similar elements in data sets. For example, a matching score between 0 and 100 may be assigned to represent the similarity between road names in messages and road names as in a digital map. The matching between roads may involve filtering the results based on the associated matching scores. In one embodiment, per a road name scraped from a media message, the road from the digital map with the highest matching score may be selected.

Process 100 concludes at 120 with adjusting at least one property in the digital map of the segments of the roads identified as affected by the incident, according to one embodiment. For example, the digital map may be updated to account for road closures due to the incident, e.g., by marking the corresponding segments as closed. Further, various hazard risk related characteristics may be updated, such as, obstructed visibility (e.g., due to smoke, pile, fog, etc.), slippery surface (e.g., due to temperature or applied chemicals to fight the wildfire), etc. In one embodiment, the adjusted properties may be communicated to consumers or users of the digital map, e.g., via navigation devices or Web sites, to warn the potential travelers about the potential danger of traversing the affected or threatened road segments. The adjusted properties may be used by routing algorithms for trip planning and/or re-routing. A new route may be planned and/or an already planned route may be altered, e.g., before or while traversing it by a user, based on the adjusted properties of the digital map. For example, the new or altered route may avoid the part of the road network identified as already affected and or likely to be affected by the incident. The route planning and/or route altering may depend on the identified impact of the occurring incident, e.g., the intensity or severity level of affection for a particular road segment or segments, according to the information scraped from the media messages.

In one embodiment, the information scraped from the media messages and used for adjusting digital map properties may be used for generating alerts to users. For example, the alerts may be generated and exchanged via one or more private or public network services (the Internet, peer-to-peer connections, etc.), using short- and/or long-range communication technologies (such as, Wi-Fi, cellular networks, etc.). The alerts may be presented in various forms and/or formats. For example, an alert may be played by (e.g., as a sound) and/or displayed on (e.g., visually) a device used for navigation, where the device may be, e.g., portable or built in a car. Additionally, or alternatively, the alerting and/or presenting information about the incident, such as range, level of impact, probability, etc., may be published on the Web, communicated as messages (e.g., push and/or pull messages), queried (e.g., via application interface), broadcasted, etc., including via the radio.

In one embodiment, the adjusted properties of the digital map with respect to the affected (and/or likely to be affected) road segments may be presented visually, e.g., by using different colors for the affected (and/or likely to be affected) segments corresponding to the severity of the impact and possibly depending on their location relative to the incident. Other visual properties instead and/or in addition to colors may also be altered to present to a user the impact of the incident. Such visual properties may include text and/or graphics characteristics, etc. The visual properties may vary and may correspond to the grade of the impact of the incident at a particular road segment and/or location on the map. Further, the visual properties may change dynamically corresponding to changes in the behavior of the incident as observed or reported from one or more of the available sources of information about the incident, including the information scraped from the collected messages.

Figure 2:
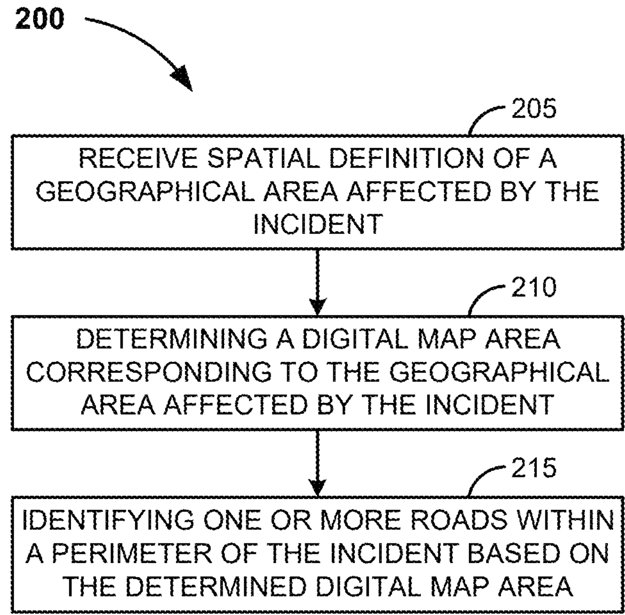
FIG. 2 is a flow diagram illustrating an exemplary process to identify roads on a digital map associated with an incident.

Typically, there are multiple roads with the same or similar names that are situated in different regions (districts, counties, towns, states, etc.), and accordingly, presented in the existing maps (either digital maps or others). A digital map spanning over a whole country or state would include multiple roads with same or similar names from different map areas. In one embodiment, the names of roads scraped from the electronic media/s are compared to roads of the digital maps that are associated with areas affected by the incident or incidents currently observed (e.g., the wildfire/s). FIG. 2 shows process 200 to identify digital map roads associated with the incident, according to one embodiment.

At 205, spatial or geospatial definitions of one or more geographical areas affected by an observed incident are received. Spatial information about various incidents may be reported and updated regularly by official organizations or institutions. For example, CAL FIRE provides spatial information about the undergoing wildfires in the state of California. This kind of information may be requested periodically or on event basis (e.g., via dedicated interfaces of APIs), received at predefined or random intervals (e.g., as broadcasted messages and/or data sets), etc. The received spatial definition data may be in a from or forms that would allow determining the geographical boundaries of the incident or incidents. Commonly, the geographical boundaries of an incident are referred to as incident polygon.

A spatial definition of an incident (or other specific geographical area) may be as simple as series of geo locations, such as Global Positioning System (GPS) coordinates, delineating the dimensions or borders of the affected area, e.g., when connected. Such series of geo location coordinates may be published or broadcasted by a public service (e.g., CAL FIRE), or sent in response of an API request, for example. The geo locations coordinates may be represented by dots on a digital map. The spatial definition may also include information how the locations define the incident polygon. For example, whether the neighboring locations shall be connected by lines (e.g., straight or/and curved) or/and by ranges around the locations to define boundaries of the affected geographical areas. Information about the spatial dimensions, shape and position of geographical areas affected by an incident may be presented and communicated in any other feasible ways, as a specialist in the field would recognize.

Based on a incident polygon, one or more areas of a digital map that correspond to one or more geographical areas affected by the incident may be determined, at 210. For example, the incident polygon may be interposed on the digital map to identify the one or more areas. The interposing may involve various techniques for applying the received spatial definition on the digital map. In one embodiment, a spatial definition may be translated to a series of geo locations that can be used to delineating incident polygon on a map, including digital map.

Further, at 215, the roads wholly or partially situated within and/or adjacent to the determined one or more digital map areas are identified. Roads partially or wholly adjacent to the determined digital map area/s may be included in the set of identified roads due the dynamics of the observed incidents. It may happen that there is information exchanged on social media concerning roads affected by a wildfire near the wildfire polygon as reported by the official sources. Therefore, the roads and road segments in a perimeter of predefined distance around the reported incident polygon as applied to the digital map may be matched to the scraped media information.

Figure 3A:
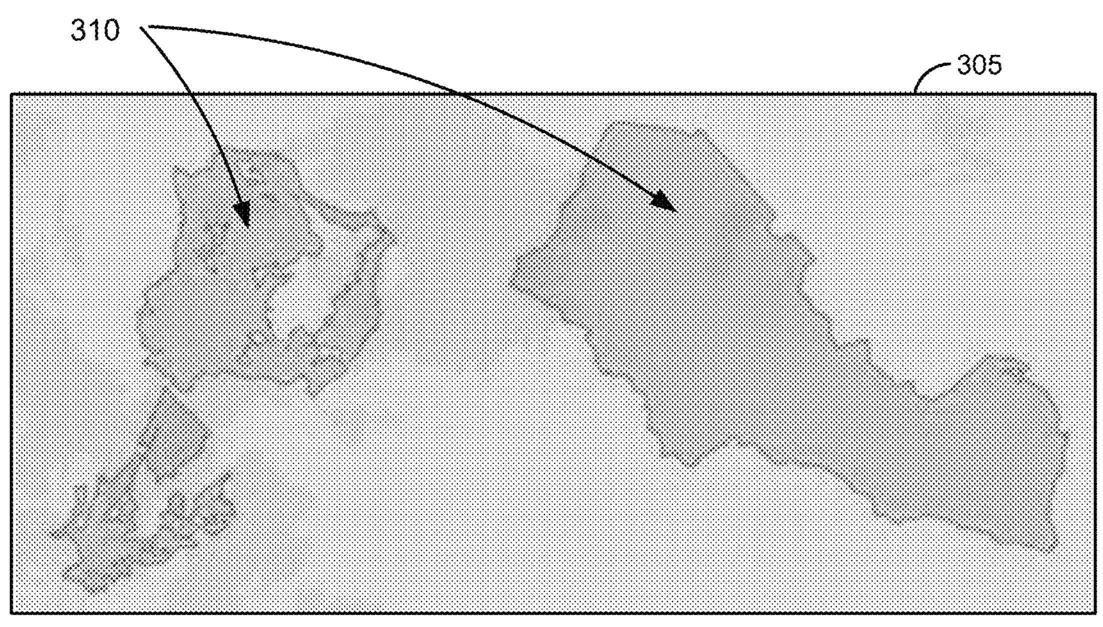
FIG. 3A illustrates an exemplary incident polygon delineated on a map, according to one embodiment.
Figure 3B:
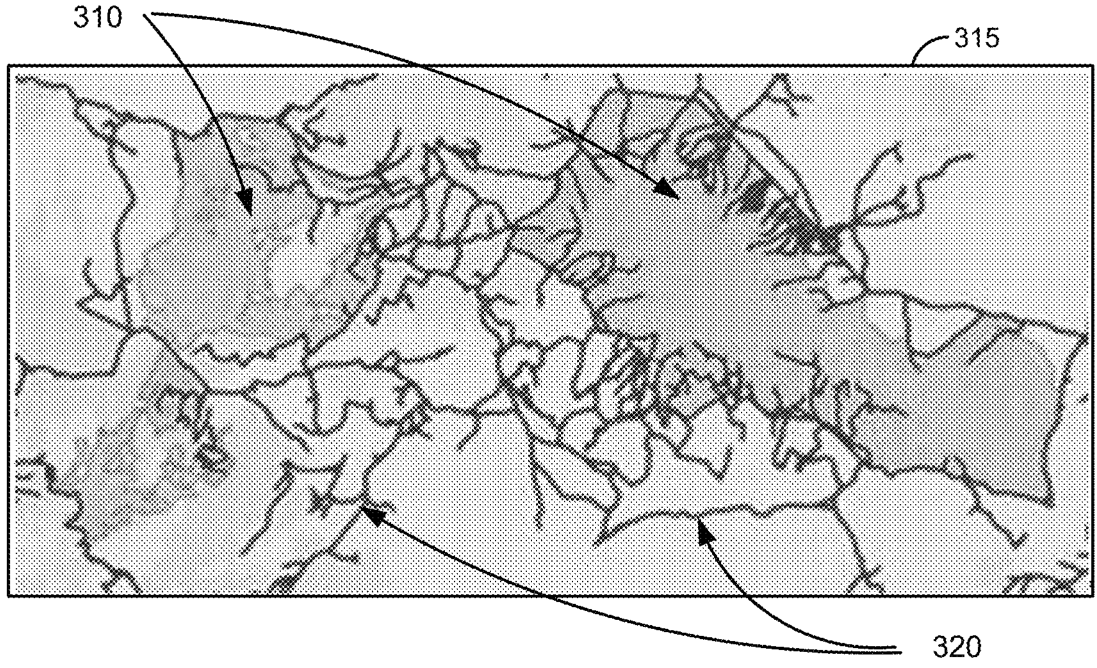
FIG. 3B illustrates an exemplary incident polygon delineated on a map also illustrating a road network associated with the incident polygon.

FIGS. 3A and 3B illustrate incident polygons 310 delineated on a map (305 in FIG. 3A and 315 in FIG. 3B, accordingly). In one embodiment, incident polygons 310 may be delineated following the procedure described in the context of process 200 of FIG. 2. A person skilled in the art may recognize that other procedures different from the described may also be applied to the same effect of delineating polygons of incidents on digital maps. The incidents, for example, may be wildfires spreading through different regions and subregions as shown on map (305 and 315). Map 315 of FIG. 3B also shows road network 320 in the area. The roads that partially or wholly fall within the delineated incident polygons or/and within a certain perimeter around the polygons may be used for matching the roads as identified from the collected messages regarding the incident.

The perimeter around the delineated incident polygons may be determined in different ways. For example, the perimeter may be determined by taking a predefined range (e.g., distance in meters or miles) around the polygon. Alternatively, the size of the perimeter may be determined based on probabilities of spreading the incident in the different directions (e.g., depending on wind direction, terrain, etc.). Such information may be obtained from different sources, including from the collected messages, depending on the type of the information. Information relevant to an incident behavior could be related to meteorology, geography, people activity, etc. In one embodiment, information relevant to the probabilities of spreading an incident may be received from the corresponding sources providing the spatial definition of the incident.

Figure 4:
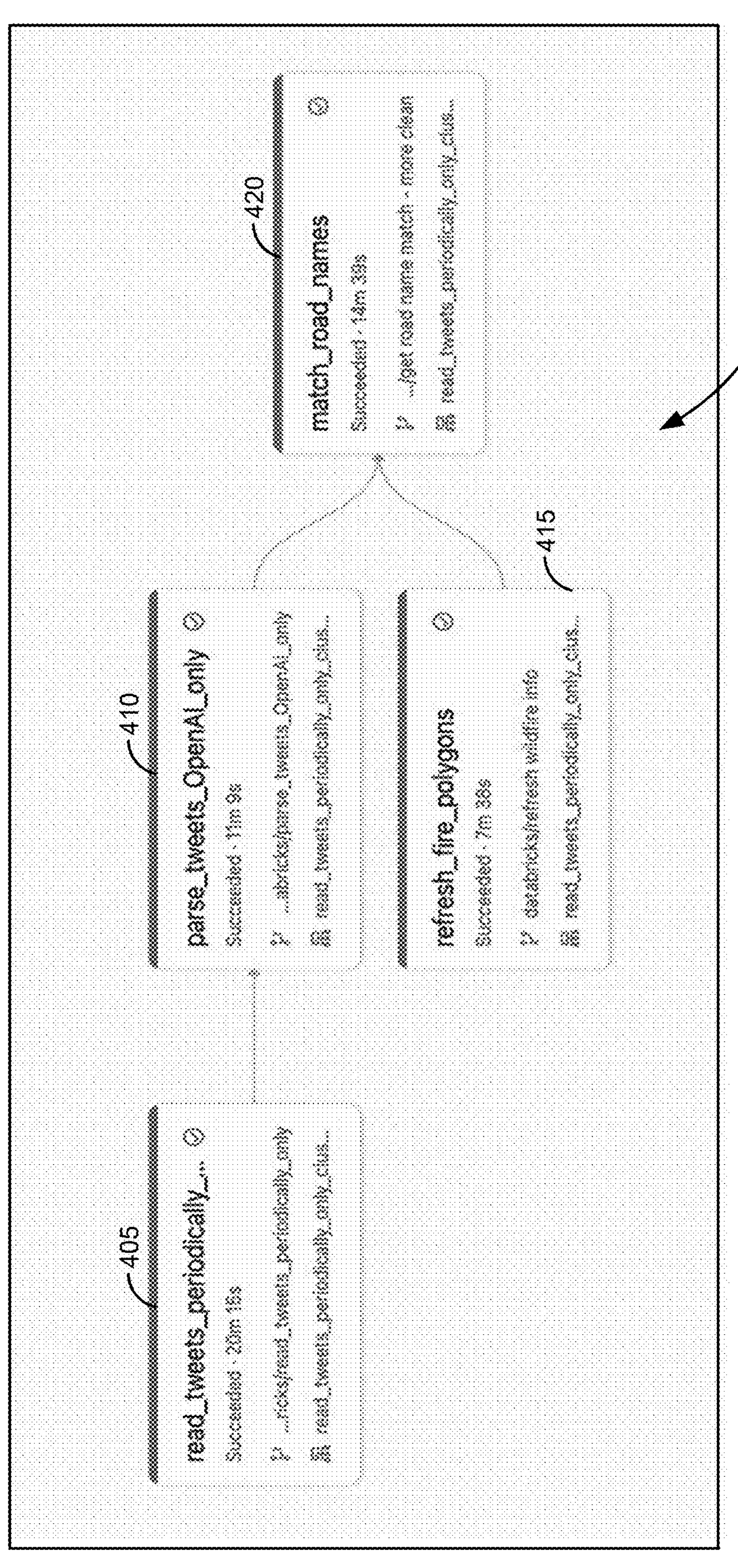
FIG. 4 is a flow diagram illustrating an exemplary process to identify rpads on a digital map associated with an incident.

FIG. 4 shows work process definition 400 integrating processes 100 (FIG. 1) and 200 (FIG. 2), according to one embodiment. As illustrated, reading and parsing of tweets (messages) at 405 and 410 is combined with refreshing fire polygons (the incident dimensions on the digital map), at 415, to extract road names to be matched at 420. The implementation of machine learning based AI solutions for either or both the parsing of the scraped messages (410) and the road names matching (420) may eliminate completely or almost completely the need of human intervention in process 400.

The work process definition illustrated with 400 in FIG. 4 may correspond to a tool developed for the purpose of automatically providing information about wild fires (and/or other incidents) on a digital map, according to one embodiment. Such a tool may have a dedicated pipeline for the steps in the described processes. The pipeline starts by gathering tweets from specific X users using the Twitter API (e.g., 405). The tool then uses ChatGPT language model to extract useful information from the tweets (e.g., 410). At the same time, the tool takes wildfire polygons from reputable sources (e.g., 415), and then matches the information from the tweets to the digital map using fuzzy matching (e.g., 420). Further, the tool may report or display information about the incident on the map, e.g., at navigation device or online. For example, the tool may display wildfire information in a real-time road network observation utility such as "Traffic Insights" provided by TomTom B.V., as an additional layer or characteristic of the road network. The tool may also require resources (e.g., a server) to maintain a persistent state for each user and to store the history of tweets per user.

In one embodiment, the information about the wildfires may be presented in different forms and/or formats, such as warnings, on map, as a table and in combination. For example, each affected road or road segment may be listed with relevant details, such as the information media source (e.g., tweet), the user (account owner) providing the information, the road closure status, the confidence level, etc. In one embodiment, color coding may be used when presenting information about roads and/or road segments affected by incidents. For example, roads in the parameter of the incident but not mentioned as affected my be shown in green, segments of roads mentioned in the collected messages but not reported as closed may be colored in orange. While, road segments reported as closed in the messages may be colored in red. Further, various statistical data processing and reporting may be utilized using the information included and associated with the collected messages.

Figure 5:
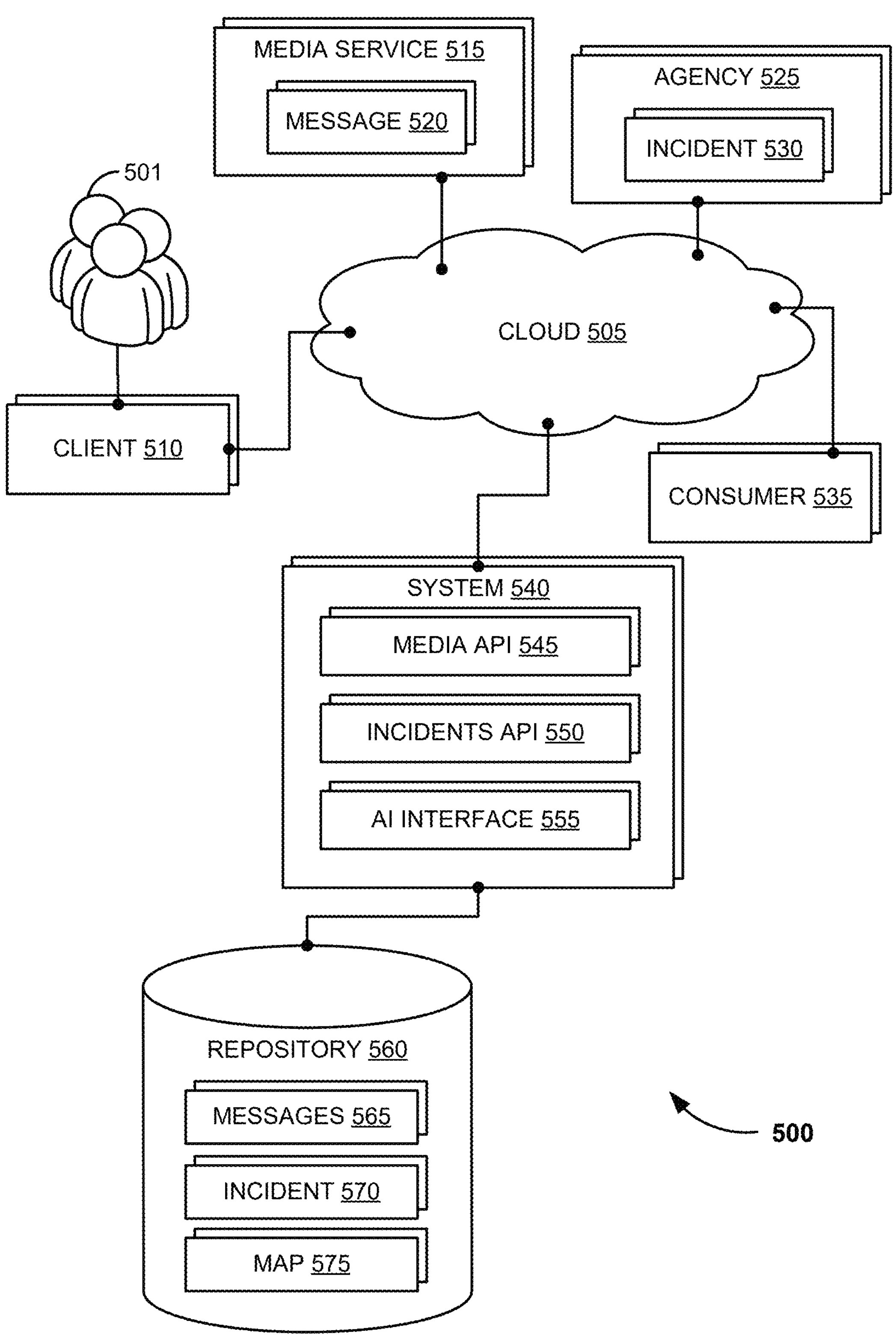
FIG. 5 is a block diagram illustrating an exemplary computing landscape to update a digital map based on media messages.

FIG. 5 is a block diagram showing computing landscape 500 where automated digital map update based on media messages is performed, according to one embodiment. The computer system landscape 500 includes a rather simplified example of cloud-based client-server architecture where one or more users 501 operate one or more client systems 510. Example of client systems may include Internet browsers or other applications run on client devices, including personal navigation devices. Users 501 may request different services or execute various operations available at client systems 510 or/and hosted on server systems, e.g., system 540. As illustrated, server system 540 represents one or more backend nodes in computer landscape 500.

Client systems 510 and server system nodes 540 may be communicating via network represented in FIG. 5 by cloud 505. At cloud 505, various other systems of different service providers may be hosted and/or available. For example, such systems are represented by media services 515, agencies 525 and consumers 535. Media services 515 may be one or more medias of different types, such as social medias, media broadcasting organizations (including radio, television, news sites, etc.), and the likes. Media services 515 may communicate messages 520 with various content, including messages that relate to incidents. There are also service providers referred here as agencies 525 that may observe and store information about various incidents 530. The messages (e.g., 520) and the information about incidents (e.g., 530) may be available at and/or accessible via the Web (e.g., cloud 505).

In one embodiment, at server system 540 one or more APIs 545 are running to communicate with media services 515. Depending on the implementation, the communication may support "push" and/of "pull" modes for receiving media messages (e.g., 520). For example, media APIs 545 may be listening for new messages, e.g., on a particular channel or page, from a particular user or subscriber. The communication between media APIs 545 and media services 515 may involve reading or/and receiving published or stored messages (520), e.g., periodically or/and upon a request. Further, media APIs 545 may also publish information on the media services (e.g., 515), according to one embodiment. Such publications may serve different purposes, for example, to report information about the status of the road network affected by an incident.

Server system 540 may further run one or more interfaces 550 to communicate with one or more systems 525 of one or more agencies that observe particular type or types of incidents. In one embodiment, information about spatial definitions of incidents (incident polygons) may be received via incidents APIs 550.

In one embodiment, the information about an incident may be extracted with the help of an AI from the messages received via corresponding media API 545 from one or more media services 515. The collected messages may be stored on repository 560 (e.g., messages 565) and used in prompting AI, e.g., using one or more interfaces 555. The extracted information about one or more incidents may be stored in the same or other repository (e.g., 560), as illustrated with 570. Further, repository 560 may include digital map data 575. Alternatively, or in addition, digital map data may be stored on a different repository or repositories, and even accessed through a different server system.

The matching between the information about incidents extracted from the media messages (e.g., 565) and the road network of the digital map (e.g., 575) may be facilitated by using AI as well. Thus, identified sets of road names may be used as an input to a corresponding AI service (e.g., via corresponding AI interface 555).

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower-level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., programming or user interface). These first and second computer systems can be configured in a server-client, peer-to-peer, or some other configuration. The clients can vary in complexity, from mobile and handheld devices, to thin clients and on to thick clients, or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
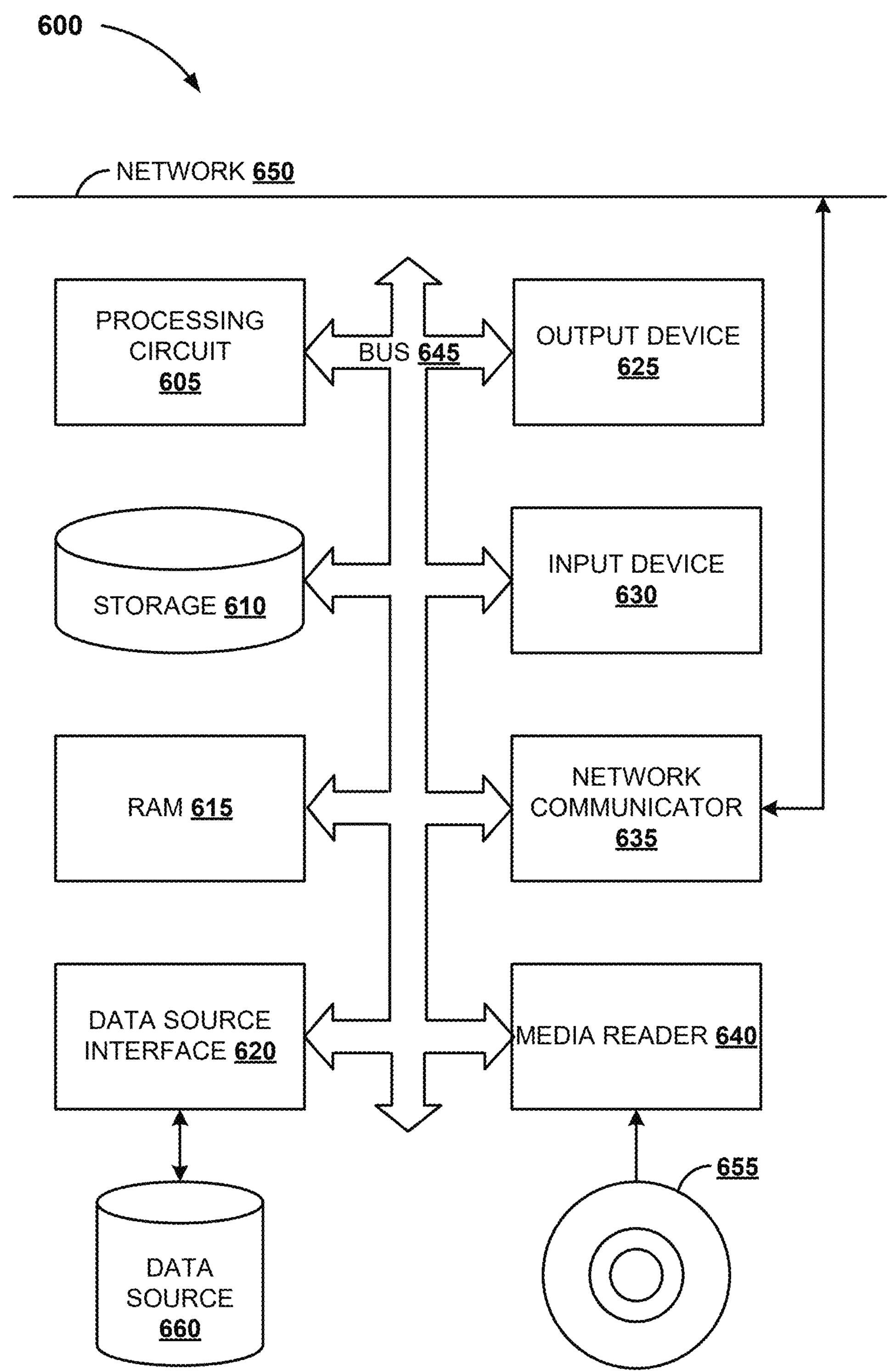
FIG. 6 is a block diagram of an exemplary computer system to update a digital map based on media messages.

FIG. 6 is a block diagram of an exemplary computer system 600 implementing at least partially automated digital map update based on media messages, according to one embodiment. Computer system 600 includes processor 605 that reads software instructions or code stored on computer readable storage medium 655, interprets them, and executes the interpreted instructions to perform at least some of the above-illustrated processes. In one embodiment, processor 605 is an integrated circuit, also called processing circuit. Computer system 600 includes media reader 640 to read instructions from computer readable storage medium 655 and store the instructions in storage 610 or in random access memory (RAM) 615. Storage 610 provides a large space for keeping static data where at least some instructions could be stored for later execution. The stored instructions may be further compiled to generate other representations of the instructions and dynamically stored in RAM 615. Processor 605 reads instructions from RAM 615 and performs actions as instructed. According to one embodiment, computer system 600 further includes output device 625 (e.g., a display) to provide at least some of the results of the execution as output including, but not limited to, visual information to users, and input device 630 to provide a user or another device with means for entering data and/or otherwise interact with computer system 600. Each of these output devices 625 and input devices 630 could be joined by one or more additional peripherals to further expand the capabilities of computer system 600.

Network communicator 635 may be provided to connect computer system 600 to network 650 and to other devices connected to network 650, including other clients, servers, data stores, and interfaces, for instance. The modules of computer system 600 are interconnected via network or bus 645. One or more of the modules of computer system 600 may represent a standalone module or/and a separate server or client system, according to one embodiment.

Computer system 600 includes data source interface 620 to access data source 660. Data source 660 can be accessed via one or more abstraction layers implemented in hardware or software. For example, data source 660 may be accessed via network 650. In some embodiments, data source 660 may be accessed via an abstraction layer, such as, a semantic layer. A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files, JSON files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., AI system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A method for updating properties of a digital map associated with roads affected by an incident, the method comprising:

collecting one or more communication messages from one or more services;

extracting information relevant to the incident from at least one of the one or more communication messages, wherein extracting the information comprises prompting a large language model with the one or more communication messages to identify data relevant to the incident, the identified data including at least one road reference;

matching the information with at least one segment of at least one road in the digital map, wherein the matching comprises:

determining a plurality of digital map road references associated with a perimeter of the incident;

evaluating similarity between the at least one road reference and the plurality of digital map road references associated with the perimeter of the incident; and selecting the at least one segment of the at least one road in the digital map based on the similarity evaluation;

adjusting, in the digital map, at least one property associated with the at least one segment of the at least one road based on the information; and communicating information about an associated intensity of the incident for some or all segments from among the at least one segment of the at least one road based on the adjusting of the at least one property.

2. The method of claim 1, wherein:

extracting the information relevant to the incident from the at least one of the one or more communication messages includes extracting the at least one road reference from the at least one of the one or more communication messages.

3. The method of claim 2, wherein the matching further comprises:

calculating a similarity score between the at least one road reference and the plurality of digital map road references associated with the perimeter of the incident using a fuzzy searching algorithm.

4. The method of claim 1, wherein determining the plurality of digital map road references associated with the perimeter of the incident comprises:

receiving a spatial definition of a geographical area affected by the incident;

determining, based on the spatial definition, an area of the digital map corresponding to the geographical area affected by the incident; and identifying one or more of roads and road segments at least partially overlapping with the determined area of the digital map.

5. The method of claim 4, wherein the determining comprises:

superposing the spatial definition of the geographical area affected by the incident on the digital map.

6. The method of claim 4 further comprising:

determining the perimeter of the incident as an expansion, according to a predefined criteria, of the area of the digital map over the spatial definition of the geographical area.

7. The method of claim 1, wherein extracting the information comprises:

prompting the large language model with the plurality of communication messages based on a predefined message structure to identify data relevant to the incident.

8. The method of claim 1, wherein the at least one road reference comprises at least one of:

a complete road name;

a partial road name;

a road alias; and a road number.

9. The method of claim 1, wherein the information relevant to the incident further comprises at least one of:

a reference to at least one region where the incident is taking or has taken place;

a status of one or more roads affected by the incident;

a boundary location relevant to the incident on a road affected by the incident; and a status of an area adjacent to a road affected by the incident.

10. The method of claim 1, wherein communicating the information about the associated intensity comprises:

triggering an alert on a navigation device.

11. The method of claim 1, wherein communicating the information about the associated intensity comprises:

planning at least one route based on the adjusting of the at least one property associated with the at least one segment.

12. The method of claim 1, wherein communicating the information about the associated intensity comprises:

altering, in a display of the digital map, a color and/or other visual property of the at least one segment based on an adjustment of the at least one property associated with the at least one segment.

13. A system that updates properties of a digital map associated with roads affected by an incident, the system comprising:

at least one interface operative to collect one or more communication messages from one or more services; and at least one processing circuit operative to:

extract information relevant to the incident from at least one of the one or more communication messages, wherein extracting the information comprises prompting a large language model with the one or more communication messages to identify data relevant to the incident, the identified data including at least one road reference;

match the information with at least one segment of at least one road in the digital map, wherein the matching comprises:

determining a plurality of digital map road references associated with a perimeter of the incident;

calculating a similarity score between the at least one road reference and the plurality of digital map road references associated with the perimeter of the incident using a fuzzy searching algorithm; and selecting the at least one segment of the at least one road in the digital map based on the similarity score;

adjust, in the digital map, at least one property associated with the at least one segment of the at least one road based on the information; and communicate information about an associated intensity of the incident for some or all segments from among the at least one segment of the at least one road based on the adjusting of the at least one property.

14. The system of claim 13, wherein:

extracting the information relevant to the incident from the at least one of the one or more communication messages includes extracting the at least one road reference from the at least one of the one or more communication messages.

15. The system of claim 13, wherein determining the plurality of digital map road references associated with the perimeter of the incident comprises:

receiving a spatial definition of a geographical area affected by the incident;

determining, based on the spatial definition, an area of the digital map corresponding to the geographical area affected by the incident; and identifying one or more of roads and road segments at least partially overlapping with the determined area of the digital map.

16. The system of claim 15, wherein the determining comprises:

superposing the spatial definition of the geographical area affected by the incident on the digital map.

17. The system of claim 13, wherein extracting the information comprises:

prompting the large language model with the plurality of communication messages based on a predefined message structure to identify data relevant to the incident.

18. The system of claim 13, wherein the at least one road reference comprises at least one of:

a complete road name;

a partial road name;

a road alias; and a road number.

19. The system of claim 13, wherein the information relevant to the incident further comprises at least one of:

a reference to at least one region where the incident is taking or has taken place;

a status of one or more roads affected by the incident;

a boundary location relevant to the incident on a road affected at by the incident; and a status of an area adjacent to a road affected by the incident.

20. The system of claim 13, wherein communicating the information about the associated intensity comprises at least one of:

triggering an alert on a navigation device;

planning at least one route based on the adjusting of the at least one property associated with the at least one segment; and altering, in a display of the digital map, a color and/or other visual property of the at least one segment based on an adjustment of the at least one property associated with the at least one segment.

* * * * *